Oct. 25, 1932.  S. G. STUCKEY  1,884,357
COMBINED GLASS PUDDLER AND FEEDER
Filed Oct. 31, 1929  3 Sheets-Sheet 1
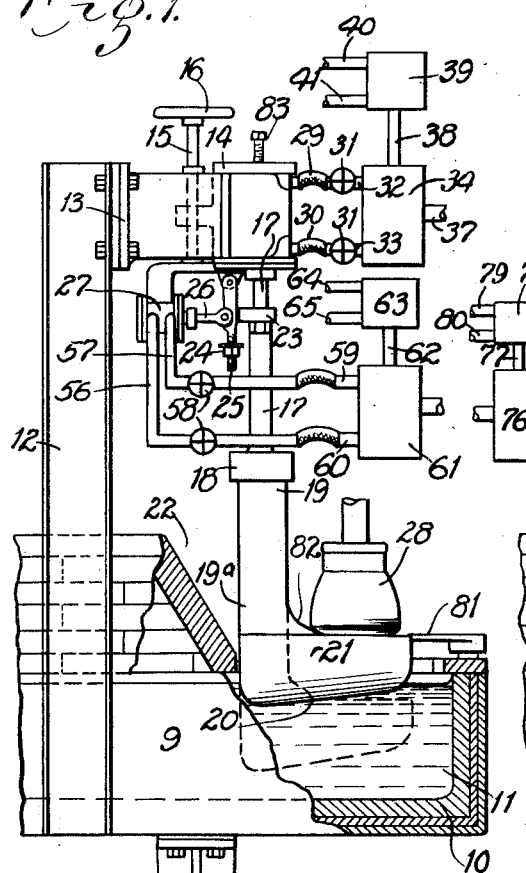
Fig.1.
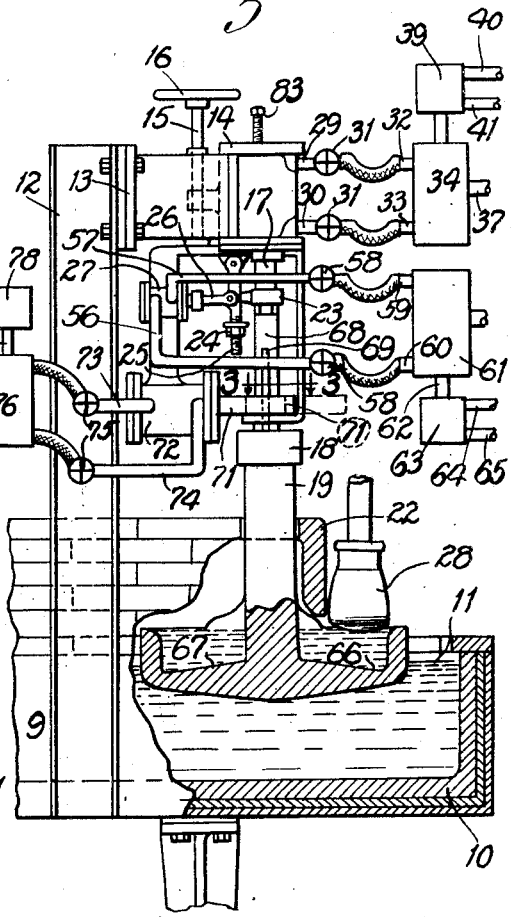
Fig.2.
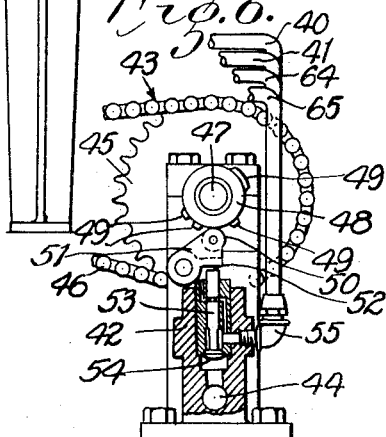
Fig.6.
Fig.8.
INVENTOR:
SAMUEL G. STUCKEY
By Edward E. Longan
ATTORNEY.

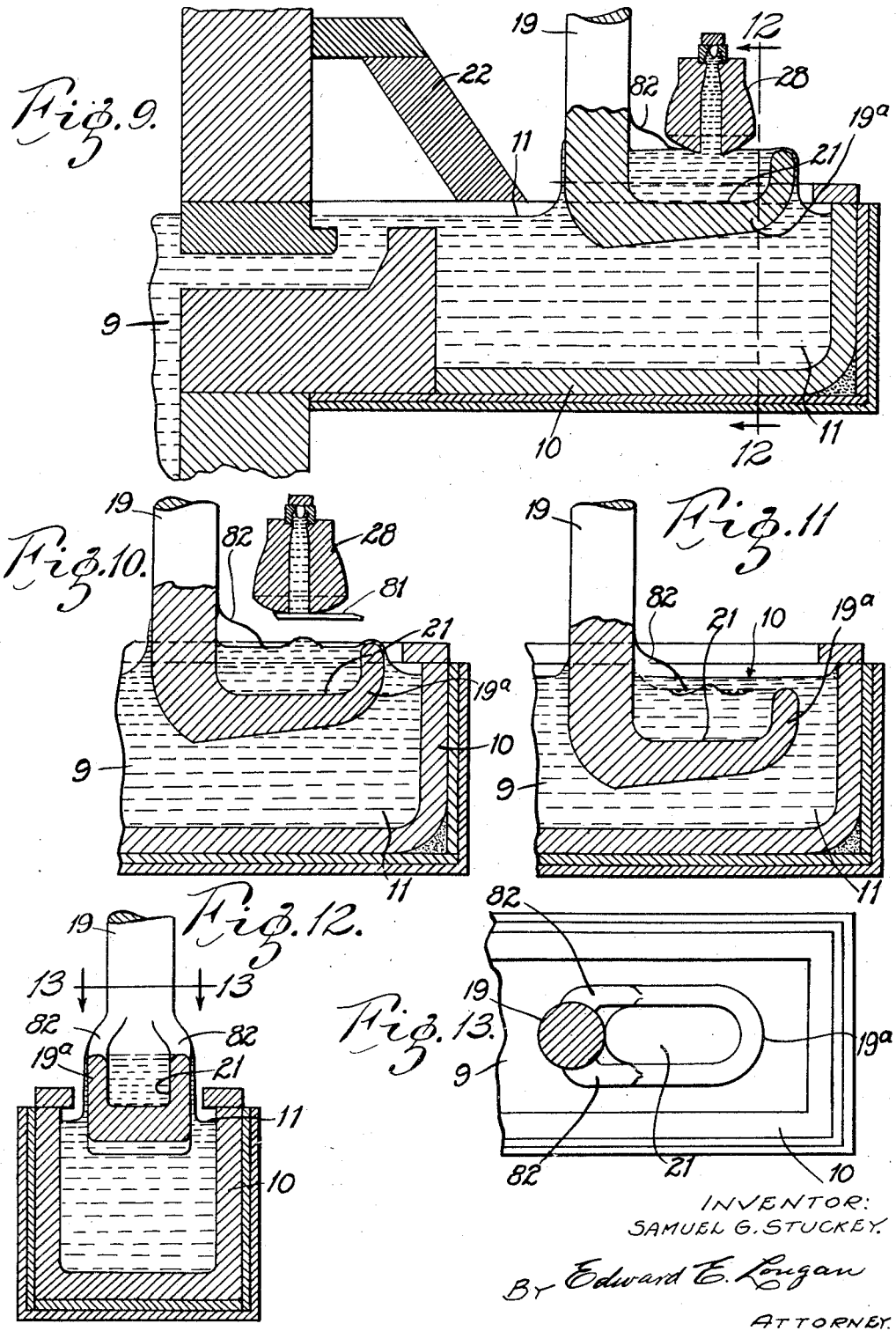

Oct. 25, 1932.  S. G. STUCKEY  1,884,357
COMBINED GLASS PUDDLER AND FEEDER
Filed Oct. 31, 1929   3 Sheets-Sheet 3

INVENTOR:
SAMUEL G. STUCKEY.
By Edward E. Longan
ATTORNEY.

Patented Oct. 25, 1932

1,884,357

UNITED STATES PATENT OFFICE

SAMUEL G. STUCKEY, OF ST. LOUIS, MISSOURI, ASSIGNOR TO OBEAR-NESTER GLASS COMPANY, OF ST. LOUIS, MISSOURI, A CORPORATION OF MISSOURI

COMBINED GLASS PUDDLER AND FEEDER

Application filed October 31, 1929. Serial No. 403,676.

My invention relates to improvements in combined glass puddlers and feeders, and has for its primary object a vertically reciprocating spoon for raising a quantity of molten glass from a pool so as to bring it in contact with the underside of a suction type blank or parison mold.

A further object is to construct a combined glass feeder and puddler having a vertically reciprocating spoon which will carry the cold spot caused in the molten glass therein by contact with a blank mold of the suction type below the surface of the pool of molten glass in which the spoon operates so that hot glass from the pool will flow over the cold spot and re-heat the same.

A further object is to construct a glass feeder having a vertically reciprocating spoon, which spoon during its operation will also puddle the glass in the pool in which it works thereby eliminating hot and cold streaks in the pool.

A still further object is to construct a glass feeder having a vertically reciprocating spoon or puddler having a glass receiving cavity, which has an inclined bottom so that as it is moved downward it will force the hot glass in the pool forward to the cold end of the pool.

A still further object is to construct a combined glass puddler and feeder using a vertically reciprocating spoon or puddler having a glass receiving cavity operating in a pool of molten glass, which spoon during its descent has a tendency to carry the hotter glass, which is near the surface of the pool, toward the bottom where it intermingles with the colder glass re-heating it thereby making the temperature of the entire pool more nearly uniform.

A still further object is to construct a glass feeder having a vertically reciprocating spoon, which during its reciprocations will pull and stir the molten glass contained in a pool in which the spoon operates so as to eliminate cold and hot streaks or layers in the pool.

A still further object is to construct a glass feeder for the suction type of blank or parison molds in which a portion of a pool of molten glass is bodily raised by a spoon and brought into contact with the bottom of the mold instead of the mold being lowered to the surface of the glass.

A still further object is to construct a combined glass puddler and feeder in which a vertically reciprocating spoon is employed for lifting a portion of the glass to parison molds of the suction type and in which the spoon can be so constructed as to feed one or more parison molds simultaneously.

A still further object is the method of feeding molten glass to blank or parison molds of the suction type without moving said molds vertically for the purpose of charging.

A still further object is the method of re-heating a chilled spot in molten glass occasioned by contact with a blank or parison mold of the suction type without changing the horizontal location of the spot.

In feeding mold charges to blank or parison molds of the suction type, a cold spot is formed, which cold spot is occasioned by the lower end of the mold coming in contact with the molten glass and chilling it. Numerous efforts have been made to eliminate this cold spot because after once being formed, if the spot were not eliminated, it would take on an additional chill each time the mold contacted therewith and after a short time defective ware would be made. Therefore the forced circulation of glass in the pool has been tried, also the idea of constantly changing or rotating the pool itself so as to carry the cold spot out of line with the contact point. All of these devices have been extremely expensive to construct and call for rather large structures, but by the use of my device the cold spot is lowered into the pool of glass in such a manner that hot glass flows over the cold spot thereby re-heating it. In this way large structures or pools are unnecessary and various circulating devices for the glass, such as are now used, are dispensed with, and in addition to re-heating the cold spot by the use of my structure, the glass contained in the pool is constantly puddled so that a uniform temperature of glass is maintained throughout the pool.

Another distinct advantage of my type of feeder is that in addition to the cold spot being lowered and re-heated by fresh glass, the shear mark, which usually causes blemishes in the finished article, is also re-heated and absorbed by the fresh glass flowing over the cold spot and shear mark thereby eliminating defects in the finished article which are occasioned by these marks.

In the drawings:

Fig. 1 is a side elevation of my device with parts in section showing one type of spoon;

Fig. 2 is a similar view showing a modified construction of spoon in which the spoon not only reciprocates but is also given a rotary movement;

Fig. 6 is a side elevation with parts in section of the timing device employed;

Fig. 8 is a sectional view of one of the slide air valves employed;

Fig. 9 is a fragmental sectional view of a front part of a glass feeder showing the spoon in mold filling position;

Fig. 10 is a similar view showing a spoon partially lowered and the glass severed or sheared;

Fig. 11 is a similar view showing the spoon entirely submerged and showing the cold spot occasioned by the mold and the shear mark submerged below the surface of the glass in the pool;

Fig. 12 is a section taken on the line 12—12 of Fig. 9;

Fig. 13 is a section taken on the line 13—13 of Fig. 12; and

Figure 14:
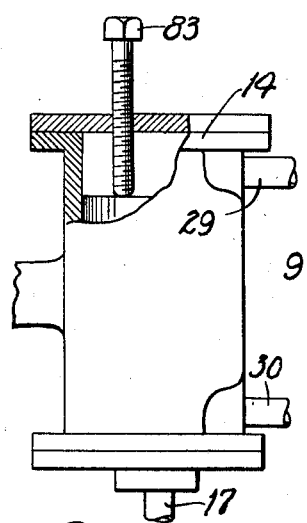
Fig. 14 is a view of the spoon lifting cylinder employed showing the manner in which the lifting stroke of the cylinder can be regulated as to length.

In the construction of my device I employ a glass furnace 9, which is provided with a forwardly projecting portion or well 10 in which a pool of glass 11 is maintained. Carried by the furnace 9 is a support 12, which carries a bracket 13. In this bracket is mounted an air cylinder 14, which cylinder can be adjusted up and down by means of a screw 15. This screw is preferably operated by means of a hand wheel 16 as shown.

Within the cylinder 14 is located a piston not shown to which a piston rod 17 is attached. The piston rod 17 is provided at its lower end with a collar 18 by means of which the shank 19 of the spoon or puddler 19a is secured to the piston. The spoon 19a has its bottom 20 inclined upwardly and forwardly so that on descending into the pool of glass it will have a tendency to move the glass below it downward and forward.

The spoon or puddler 19a is provided with a bowl or glass retaining cavity 21, which is to contain a quantity of molten glass in excess of that required for a mold charge. It will be particularly noted from the drawings that during the reciprocations of the spoon, its lower surface is never lifted out of the glass in the pool 11 so that there will be no possibility of trapping air and forcing it into the glass in the pool resulting in seedy glass.

In order to protect the glass in the pool from contact with the air as much as possible, a cover 22 is employed, which covers the major portion of the glass in the pool and also a portion of the glass in the spoon thus preventing the atmospheric air from contacting with the glass as much as possible, which would chill it.

Mounted on the piston rod 17 is a dog 23, which is designed to contact with an adjustable stop 24. The stop 24 is screw threaded on the hinged bar 25 so that it can be raised and lowered. Pivotally attached to the bar 25 is a piston rod 26, which is carried by a piston mounted in the air cylinder 27, and as this piston is moved backward and forward the stop 24 is brought into position so that it can engage with the projection 23 or be moved away therefrom. The purpose of this stop is that the spoon can be lowered a certain distance, suspended there while the glass is being severed from the underside of the parison mold 28 and then upon release the spoon will descend to its lowest position. In this way while the spoon moves upward to its highest point in a continuous movement, it has two distinct downward movements, the first being to lower the spoon just sufficient so that a shear member can be introduced between the upper edge of the spoon and the lower edge of the parison mold and shear off the glass, and then the second downward movement takes place, which lowers the glass in the spoon below the level of the surface of the glass in the pool thus permitting fresh hot glass to flow over the sides of the bowl and flow over the cold spot occasioned by the parison mold contacting with the glass in the spoon and also over the shear mark, thereby re-heating the same. It will be noted that the glass can only flow over the edge of the bowl at the side directly onto the cold spot and at the front, flanges on either side of the bowl being provided for the purpose of directing the hot glass to the cold spot in the bowl.

The air cylinder 14 has attached thereto conduits 29 and 30, a portion of these conduits being flexible so that the cylinder 14 can be raised and lowered. The conduits are supplied with valves 31 by means of which the flow of air can be regulated. The valves 31 are in turn attached to conduits 32 and 33, which are in turn secured to a valve housing 34 in which a slide valve 35 is mounted.

The valve housing 34 is provided with an exhaust port 36 and with an inlet pipe 37, which inlet pipe is attached to any suitable source of air supply. The slide valve 35 carries a piston rod 38, the opposite end of which rod is attached to a piston located in the air cylinder 39. The air cylinder 39 has conduits 40 and 41 attached thereto, these conduits leading to a valve 42 which is operated by any suitable timer driving mechanism 43. This timer driving mechanism may be driven by an electric motor or any other suitable means by means of which its operation can be controlled.

The valve 42 has an air passage 44 which is connected to a suitable source of air power supply, this supply being constant. The valve mechanism 43 or at least the operating portion thereof, as illustrated, consists of a sprocket wheel 45, which is operated by a sprocket chain 46. The sprocket wheel 45 is mounted on a shaft 47 on which a series of cams 48 are secured. These cams are provided with lugs 49, which are designed to contact with rollers 50 carried by rocker arms 51. These rocker arms, on being contacted with by the cam projections 49, are depressed and brought into contact with the ends 52 of the valve stems 53.

The valve stems 53 carry a valve 54 preferably of the mushroom-type and on being depressed permit air to pass from the passage 44 into the conduit 55 and from there into the conduits or pipes 40 and 41 alternately, this depending entirely on which valve is moved, there being two valves for each of the aforementioned conduits or pipes 40 and 41 so that the movement of the piston within the cylinder 39 can be made reciprocating. This reciprocating movement of the piston in the air cylinder 39 is communicated to the piston rod 38 and moves the valve 35 backward and forward thus alternately permitting air, which enters the valve housing 34 through the pipe or conduit 37, to pass alternately into the conduits 32 and 33 thereby reciprocating the piston in the air cylinder 14 and raising and lowering the spoon 20 and it is in this way that the quantity of glass is raised to the parison mold.

The air cylinder 27 has attached thereto conduits 56 and 57 which are provided with valves 58. These valves in turn are attached to conduits 59 and 60, the ends of which are carried by a valve housing 61, which is of identical construction as the valve housing 34, as is also the valve and inlet and outlet ports contained therein.

The valve in the housing 61 is attached to the slide valve located therein by means of the piston rod 62, the opposite end of which is secured to a piston located in the air cylinder 63. This air cylinder has conduits or inlet pipes 64 and 65 secured thereto, which conduits or pipes are attached to valves similar to the valve 42, which has just been previously described, so that upon the operation of these valves the slide valve in the valve housing 61 will be moved forward and back causing the piston in the air cylinder 27 to move forward and back and thus intermittently release the dog 23 thereby permitting the spoon or puddler to descend to its fullest extent as has been previously described.

Figure 3:
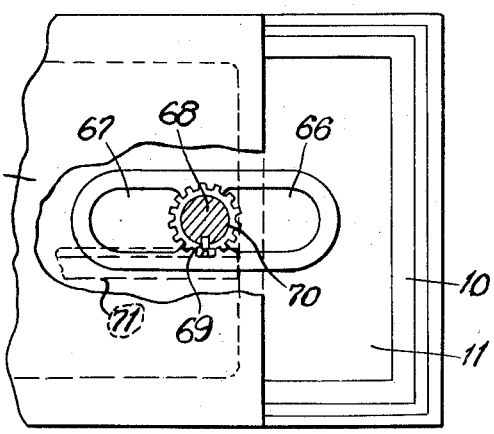
Fig. 3 is a section taken on the line 3—3 of Fig. 2.

In Figs. 2 and 3 I have shown a modified form of spoon in which two bowls 66 and 67 are provided. This spoon is operated upward and downward in precisely the same manner as has been previously described, but in addition the piston rod 68 is provided with a key 69, which slidably passes through a gear 70. This gear meshes with a rack 71, which rack is moved backward and forward by means of a piston located in the air cylinder 72. This air cylinder has conduits 73 and 74 attached to opposite ends, which conduits are provided with regulating valves 75.

The conduits 73 and 74 are attached to a valve housing 76 in which a slide valve of the same construction as that located in the housing 34 is located. The slide valve is in turn provided with a piston rod 77, the opposite end of which is secured to a piston located in the air cylinder 78. The air cylinder 78 has conduits 79 and 80 attached thereto, which lead to valves of the same construction as the valve 42, all of the valves controlling admission to the air cylinders 37, 63 and 78 being operated by the cams mounted on the shaft 47, the cams being so arranged on the shaft and secured thereto that the proper sequence of operation will take place.

81 represents a shear which may be of any conventional form and which is to sever the glass between the mold and the spoon when the same has been partially lowered and in order to make a neat and clean job I prefer to have this shear act in conjunction with the bottom of the parison mold, that is have the bottom of the parison mold act as one blade of the shear and the member 81 as the opposite member of the shear. However I do not desire to limit myself to this precise construction of shear shown and described. Neither have I shown any means by which these shears are operated since such means are well known to persons skilled in the glass art and such means form no part of my present invention.

Figure 4:
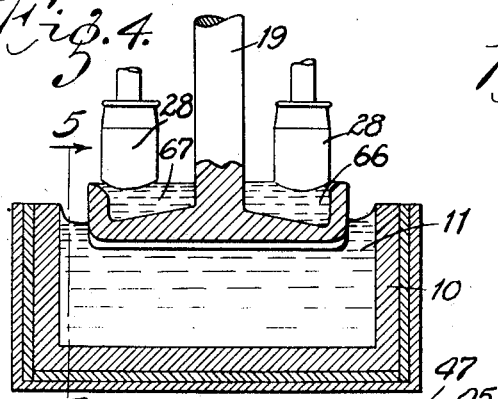
Fig. 4 is a modified form of construction showing a spoon as used for feeding two blank or parison molds simultaneously.
Figure 5:
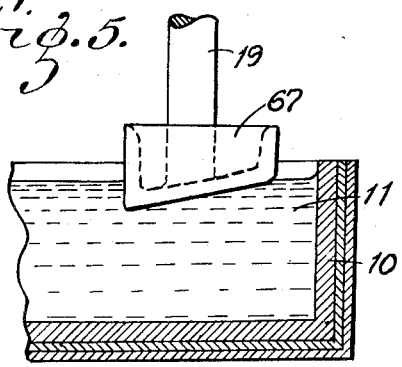
Fig. 5 is a section taken on the line 5—5 of Fig. 4.
Figure 7:
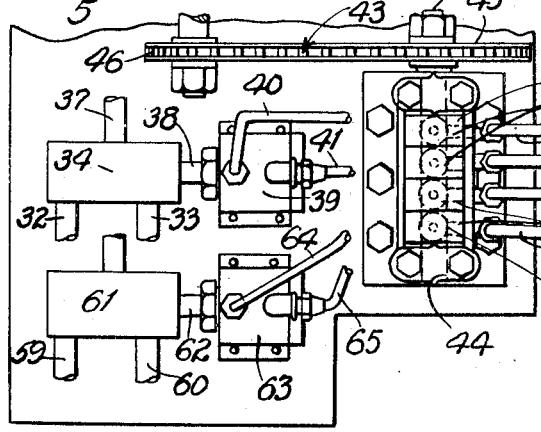
Fig. 7 is a top plan view of the same.

In Figs. 4 and 5 I have shown a modification of form of spoon by means of which it is possible to feed two molds at the same time, the structure of this device or modification being similar to the structure disclosed in Figs. 1 and 2 and its operation being the same as that disclosed in Fig. 1.

The operation of my device is as follows:

I will first describe the operation of the device as shown in Figs. 1, 9, 10 and 11. The first step is to establish a pool of molten glass in the projecting portion 10. This pool is maintained constant being constantly fed from the melting furnace. The spoon or puddler after being properly connected, as mentioned previously, is assumed to be in its lowered position. The timing device is then placed in operation, which admits air through the manipulation of the piston in the air cylinder 39 and the slide valve 35 in the valve housing 34 to the underside of the piston in the cylinder 14. This causes the spoon to rise upward thereby carrying with it a predetermined amount or segregated portion of molten glass from the pool. The spoon moves up to a distance sufficient to cause the glass contained therein to contact with the underside of the suction mold 28. When this contact is made, suction being on, the molten glass from the segregated portion is drawn into the parison mold. The spoon still continues to rise a slight distance so that the mold will have sufficient time to fill without it breaking contact with the surface of the glass in the spoon or the mold may be dipped deep enough to take care of all glass required without further rising of the spoon.

When the mold has become filled, the timing device has turned sufficiently far to cause the piston in the cylinder to move in the opposite direction and admit air into the upper end of the cylinder 14 thus driving the piston rod 17 downward causing the dog 23 to contact with the adjustable stop 24 thereby halting further descent of the spoon or dipper. This position is shown in Fig. 10. The dog is adjusted so the distance that the spoon is lowered will not neck in the connecting glass to the extent that it will lap over when it falls after severing from the parison mold 28 to the upper surface of the glass still remaining in the spoon or glass receiving cavity.

The next step is for the shear 81 to commence to operate and sever the glass immediately below the parison mold permitting the portion above the surface in the spoon to drop down into the segregated mass. This also carries with it the chill occasioned by the shear operating. Consequently the glass, which has been chilled by contact with the lower end of the parison mold and by the action of the shear, drops into the spoon.

As soon as the shearing operation is completed the air cylinder 27 has air admitted thereto, swinging the bar 25 backward so that the stop 24 will release the dog 23 and permit the spoon to descend into the pool of glass to its fullest extent. This is clearly shown in Fig. 11 and it will be noted that the dipper descends to such a distance into the established pool of glass that this glass can overflow the sides of the spoon and cover the chill mark occasioned by contact with the parison mold and also the additional chill caused by the shearing so that upon the next operation of the spoon, glass which has not been contacted with either by the mold or the shear, is brought into contact with the mold. The movement of the spoon, however, is slow enough so as to permit the added hot glass, which flows over the chill marks previously described, to absorb heat therefrom and become re-heated and thus any blemishes caused by cold glass, due to these contacts, are eliminated. During the up and down movement of the spoon it is to be particularly noted that the under surface of the spoon never is raised above the surface of the glass in the pool so that all possibility of trapping air and forcing such air into the glass in the form of bubbles is eliminated.

Another important feature is that the bottom of the spoon is inclined upward and forward so that as this dipper descends it will have a tendency to force the glass in the pool forward and not toward the furnace or supply, and at the same time while descending puddles the glass, that is in forcing its way downward in the glass it displaces the glass in the forwardly projecting portion which is variously termed such as the boot or spout both in a forward inside and sidewise direction thus thoroughly intermingling the glass in this portion thereby reducing and practically eliminating the possibility of cold streaks in the glass, which will necessarily form in the projecting portion 10.

It will also be noted that the spoon or puddler is provided with baffles or upwardly extending portions 82. These portions are located adjacent the shank 19 and prevent the molten glass in the well from flowing into the rear end of the bowl or cavity of the spoon or puddler. My purpose in doing this is to cause the glass to flow into the spoon or cavity from the forward end so that it will have a tendency to cover the cold spot occasioned by contact with the mold and also cover the shear mark.

It will also be noted especially from Figs. 4 and 12 that the well is only slightly wider than the width of the spoon or puddler so that as the spoon descends it will have a puddling action and thoroughly agitate all of the glass in the well. In this way I obtain a greater amount of stirring or puddling action of the glass than would be possible were the well wider.

It is also to be understood that from the construction disclosed in Fig. 3, in addition to the puddling action, a certain amount of current is created on account of the rotation of the spoon or puddler in addition to its upward and downward movement. The width of the well in the last mentioned figure is necessary to permit the puddler or spoon to rotate.

It will be further noted that by my construction, and more especially by adjusting the screw 83, which extends into the cylinder 14 through its top head, that the depth of dip of the suction mold can be regulated. This is essential because parison molds of various capacities are used in the manufacture of glassware and where only a slight quantity of glass is required to fill the parison mold, it is not necessary that it be dipped as deep into the surface of the segregated glass or the glass in the cavity of the puddler as where a greater amount of glass is required.

It is, however, essential in all cases that the mold enter the surface of the segregated glass to a sufficient depth so that the mold will be completely filled by suction without any air being drawn up into the mold because if any air entered this mold during the filling due to lowering of the glass surface, it would create imperfections in the finished ware, either in the form of bubbles or seedy glass. The purpose of the hand wheel 16 and screw 15 is to raise the cylinder 14 and its connected parts, including the spoon, entirely out of the well 11 so that when it becomes necessary to change spoons the same can be lifted completely out of the well and the well covered to prevent chilling of the glass during such changes or replacements.

It will be further observed from the foregoing description that the lower end of the screw 83 acts as an abutment for the piston in the cylinder 14 so as to limit its upward movement while the lower cylinder head acts as a stop for the piston when it reaches its lowest position. By this construction I am enabled to definitely limit the amount of dip or insertion of the parison mold in the molten glass contained in the spoon or glass retaining cavity and while this may be varied, the spoon or puddler will always descend to the same depth into the well. In other words, while I can vary the uppermost position of the spoon or puddler, its lowest position is not varied so that at all times I obtain a sufficient flow of glass over the sides and front of the spoon or glass retaining cavity to cover the chilled spots occasioned by mold contact and shearing and the amount of glass passing over these spots is the same at all times when the spoon is lowered thereby insuring a complete re-heating and covering of these spots.

It will also be noted that in addition to the limitation of the upward stroke of the piston in the cylinder 14 that the entire cylinder can be lowered by means of which the dip of the spoon or puddler into the glass in the pool can be varied. In other words, I can regulate the distance below the surface of the glass in the pool to which the chill marks occasioned by contact with the mold and the severing means can be submerged independently of the adjustment of the screw 83.

Having fully described my invention, what I claim is:—

1. A combined glass puddler and feeder comprising a well adapted to contain a constant supply of molten glass, an imperforate spoon extending therein and in constant contact with said supply, and means for reciprocating said spoon vertically thereby puddling the glass in the well and bring the glass in the spoon into contact with a mold to be filled by suction.

2. A combined glass puddler and feeder comprising a well having a constant supply of molten glass, a puddler having a glass retaining cavity closed at its bottom therein and mounted for vertical reciprocation in said well, means for vertically reciprocating said puddler so that at the end of its upward movement a suction mold can draw a charge therefrom without raising said puddler entirely out of the glass in the well, the lowering of the puddler puddling the glass in the well and also permitting glass from the well to flow into and refill said cavity.

3. A combined glass puddler and feeder comprising a well, a puddler having a glass retaining cavity, the bottom of said puddler inclined forwardly and upwardly substantially from one end to the other, means for vertically moving said puddler in said well whereby glass retained in said cavity is alternately raised into contact with a suction mold and the chilled spot occasioned by such contact lowered below the surface of the glass in the well during such reciprocation.

4. A combined glass puddler and feeder comprising a well adapted to contain molten glass, a vertically reciprocating spoon having a bowl, the under surface of which inclines upwardly in a forward direction, means for raising and lowering said spoon, means for momentarily halting the descent of said spoon when a partial descent has been made, and means for periodically moving said halting means into and out of operative position.

5. A combined glass puddler and feeder comprising a well adapted to contain molten glass, a vertically reciprocating spoon having a bowl, the under surface of which inclines upwardly in a forward direction, means for raising and lowering said spoon, means for momentarily halting the descent of said spoon when a partial descent has been made, adjustable means adapted for engagement with said halting means whereby the position of said spoon at the time of halting can be predetermined, and means for periodically moving said halting means into and out of operative position.

6. A combined glass puddler and feeder comprising in combination with a well having a constant supply of molten glass delivered thereto, of a spoon having an imperforate bottom adapted to receive and retain a portion of the glass in the well, means for raising said spoon upwardly so that a suction mold can be fully charged therefrom, said means also adapted to lower said spoon below the surface of the glass in the well so that the glass in the well will be simultaneously puddled and flow into said spoon thereby covering and re-heating chilled spots therein.

7. A combined glass puddler and feeder comprising in combination with a well having a constant supply of molten glass delivered thereto, of a spoon adapted to receive and retain a portion of glass from the well, said spoon having its bottom surface forwardly and upwardly inclined substantially from one end to the other, means for raising said spoon so that a suction mold can be fully charged therefrom without raising said spoon entirely out of the glass in the well, said means also adapted to lower said spoon below the surface of the glass in the well so that the glass in the well will be puddled and a portion thereof be forced forward in the well by the inclined bottom of the spoon whereby the same will flow into the front end of the spoon and cover and re-heat chilled spots in the glass remaining in the spoon and simultaneously refill the spoon.

8. The method of feeding molten glass into molds, which consists in segregating and bodily elevating a predetermined body of molten glass from a pool of glass sufficiently to contact with the lower end of a parison mold, filling said elevated mold from said body by suction, lowering the remainder of said elevated body of glass to a predetermined distance below said parison mold, severing the glass in the mold from said body, and then submerging the remainder of the elevated body of glass in the glass in the pool, whereby fresh molten glass flows over the top of the elevated glass remaining.

9. The method of feeding glass into molds of the suction type which consists in establishing a pool of molten glass, segregating a body of glass from said pool, raising said segregated body of glass bodily into contact with a mold, filling said mold by suction, lowering said segregated body of glass a predetermined distance, severing the mold charge from said segregated body, and then lowering the remainder of the segregated body below the surface of the glass in the pool thereby covering the cold spots occasioned by contact with the bottom of the mold and the shear with fresh molten glass.

10. The method of feeding glass into molds of the suction type, which consists in establishing and maintaining a pool of molten glass, segregating a body of glass from said pool, elevating said segregated body into contact with the bottom of a mold, filling said mold with glass by suction, lowering said segregated body of glass a predetermined distance, shearing the glass in the mold from the remaining glass of the segregated body, lowering the remainder of said segregated body below the surface of the glass in the pool for replenishing the glass drawn therefrom by the mold and simultaneously therewith covering the chilled spots resulting from contact with the mold and shear with fresh molten glass.

11. A combined glass puddler and feeder comprising a well adapted to contain a pool of molten glass, a vertically reciprocating spoon having a bowl, the under surface of which inclines upwardly in a forward direction, means for raising and lowering said spoon, adjustable means for limiting the upward movement of said spoon, means for momentarily halting the descent of said spoon when a partial descent has been made, means for periodically moving said halting means into and out of operative position, and means for bodily lowering said raising and halting means whereby the lowermost position of the spoon in the well can be regulated.

12. A combined glass puddler and feeder comprising in combination with a pool having a constant supply of molten glass therein, of a spoon adapted to receive and retain a portion of the glass in the pool, means for raising said spoon upwardly into contact with a suction mold so that the same can be fully charged therefrom, adjustable means for limiting the upward movement of said spoon whereby the dip of the suction mold into the glass in the spoon can be controlled, the means for raising said spoon also adapted to lower said spoon below the surface of the glass in the pool so that the glass in the pool will be simultaneously puddled and flow into the spoon thereby covering and re-heating chill spots therein, and means for raising and lowering said spoon raising means whereby the lowest position of the spoon in the pool can be controlled independently of its highest position.

13. A combined glass puddler and feeder comprising a well adapted to contain molten glass, a vertically reciprocating spoon having a bowl, means for raising and lowering said spoon, means for momentarily halting the descent of said spoon after partial descent thereof, and means for periodically moving said last mentioned means into and out of operation position.

14. The combination with a mold and shearing mechanism, of a combined glass puddler and feeder for supplying molten glass to said mold and comprising a well adapted to contain molten glass, a vertically reciprocating spoon having a bowl, means for raising and lowering said spoon, means for momentarily halting said spoon after partial descent thereof to thereby enable said shearing mechanism to shear between said mold and spoon, and means for periodically moving said halting means into and out of operative position.

In testimony whereof I have affixed my signature.

SAMUEL G. STUCKEY.